(12) United States Patent
Ziegler et al.

(10) Patent No.: US 12,251,906 B2
(45) Date of Patent: Mar. 18, 2025

(54) BEARING LAMINATE COMPRISING A FOAM LAYER

(71) Applicant: SAINT-GOBAIN PERFORMANCE PLASTICS PAMPUS GMBH, Willich (DE)

(72) Inventors: Julia Ziegler, Leverkusen (DE); Jens D. Speicher, Willich (DE); Georges J. Moineau, Bolland (BE); Juergen Hartmann, Hergatz (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 17/812,888

(22) Filed: Jul. 15, 2022

(65) Prior Publication Data

US 2022/0355582 A1 Nov. 10, 2022

Related U.S. Application Data

(63) Continuation of application No. 16/177,638, filed on Nov. 1, 2018, now abandoned.
(Continued)

(51) Int. Cl.
*B32B 27/06* (2006.01)
*B32B 5/32* (2006.01)
(Continued)

(52) U.S. Cl.
CPC ............. *B32B 27/065* (2013.01); *B32B 5/32* (2013.01); *B32B 7/12* (2013.01); *B32B 15/046* (2013.01);
(Continued)

(58) Field of Classification Search
CPC ........ G05F 1/67; G06F 2119/06; G06F 30/20; H10N 10/10; H10N 10/17; H10N 10/80; B32B 15/046; B32B 2266/0278; B32B 2307/546; B32B 2307/554; B32B 2307/56; B32B 2307/72; B32B 2307/734;
(Continued)

(56) References Cited

U.S. PATENT DOCUMENTS 3,574,429 A 4/1971 Reising
4,891,085 A 1/1990 Mulligan
(Continued)

FOREIGN PATENT DOCUMENTS

CN 101542159 A 9/2009
CN 101715519 A 5/2010
(Continued)

OTHER PUBLICATIONS

International Search Report and Written Opinion for PCT/EP2018/080036, mailed Jan. 25, 2019, 14 pages.

*Primary Examiner* — Hai Vo
(74) *Attorney, Agent, or Firm* — Abel Schillinger, LLP; Ann Palma

(57) ABSTRACT

A bearing laminate can include a metal support layer, a foam layer overlying the metal support layer, the foam layer including a polymeric foam; and a sliding layer overlying the polymeric foam layer, the sliding layer comprising a polymer matrix. Bearing articles made from the bearing laminate can have exceptional damping properties, such as a high damping ratio combined with a low dynamic stiffness.

20 Claims, 6 Drawing Sheets

Related U.S. Application Data

(60) Provisional application No. 62/580,555, filed on Nov. 2, 2017.

(51) Int. Cl.
| | | |
|---|---|---|
| *B32B 7/12* | (2006.01) | |
| *B32B 15/04* | (2006.01) | |
| *B32B 27/32* | (2006.01) | |
| *B32B 37/12* | (2006.01) | |
| *F16C 33/20* | (2006.01) | |

(52) U.S. Cl.
CPC ............ *B32B 27/322* (2013.01); *B32B 37/12* (2013.01); *F16C 33/20* (2013.01); *F16C 33/201* (2013.01); *F16C 33/205* (2013.01); *F16C 33/206* (2013.01); *F16C 33/208* (2013.01); *B32B 2266/0278* (2013.01); *B32B 2307/546* (2013.01); *B32B 2307/554* (2013.01); *B32B 2307/56* (2013.01); *B32B 2307/72* (2013.01); *B32B 2307/734* (2013.01); *B32B 2307/746* (2013.01); *B32B 2457/00* (2013.01); *B32B 2475/00* (2013.01); *B32B 2605/08* (2013.01); *F16C 2208/12* (2013.01); *F16C 2208/30* (2013.01); *F16C 2208/32* (2013.01); *F16C 2208/70* (2013.01); *F16C 2208/72* (2013.01); *F16C 2208/76* (2013.01); *F16C 2208/78* (2013.01); *F16C 2226/40* (2013.01)

(58) Field of Classification Search
CPC .......... B32B 2307/746; B32B 2457/00; B32B 2475/00; B32B 2605/08; B32B 27/065; B32B 27/322; B32B 37/12; B32B 5/32; B32B 7/12; F16C 2208/12; F16C 2208/30; F16C 2208/32; F16C 2208/70; F16C 2208/72; F16C 2208/76; F16C 2208/78; F16C 2226/40; F16C 33/20; F16C 33/201; F16C 33/205; F16C 33/206; F16C 33/208
See application file for complete search history.

(56) References Cited

U.S. PATENT DOCUMENTS

| | | | |
|---|---|---|---|
| 5,106,884 | A | 4/1992 | Turner et al. |
| 5,123,151 | A | 6/1992 | Uehara |
| 5,468,531 | A | 11/1995 | Kikukawa |
| 5,893,647 | A | 4/1999 | Mochizuki |
| 6,303,731 | B1 * | 10/2001 | Carlson ................... C08L 25/00 525/127 |
| 6,863,443 | B2 | 3/2005 | Mahling |
| 7,824,104 | B2 | 11/2010 | Brinkmann et al. |
| 8,333,665 | B2 | 12/2012 | Kohara |
| 8,979,376 | B2 | 3/2015 | Angenheister |
| 9,150,255 | B2 | 10/2015 | Marchesano et al. |
| 10,094,440 | B2 | 10/2018 | Lepine |
| 10,640,677 | B2 | 5/2020 | Tachiki |
| 2005/0186367 | A1 | 8/2005 | Hanrahan |
| 2006/0251887 | A1 | 11/2006 | Welsch |
| 2007/0190307 | A1 | 8/2007 | Li |
| 2008/0232864 | A1 | 9/2008 | Izutani |
| 2010/0027924 | A1 * | 2/2010 | Wulf ..................... F16F 1/3876 384/91 |
| 2010/0027929 | A1 | 2/2010 | Kohara |
| 2010/0092119 | A1 | 4/2010 | Angenheister |
| 2010/0258344 | A1 | 10/2010 | Creasy |
| 2013/0183488 | A1 | 7/2013 | Liao |
| 2015/0093066 | A1 | 4/2015 | Speicher |
| 2016/0178006 | A1 | 6/2016 | Hartmann |
| 2016/0262291 | A1 | 9/2016 | Tucker et al. |
| 2018/0252890 | A1 | 9/2018 | Schmitt |

FOREIGN PATENT DOCUMENTS

| | | |
|---|---|---|
| CN | 103998237 A | 8/2014 |
| DE | 202005006868 U1 | 10/2006 |
| EP | 3379314 A2 | 9/2018 |
| JP | 2002347057 A | 12/2002 |
| JP | 2010510451 A1 | 4/2010 |
| JP | 2010523910 A | 7/2010 |
| JP | 2017125147 A | 7/2017 |
| KR | 10-2009-0082270 | 7/2009 |

* cited by examiner

BEARING LAMINATE COMPRISING A FOAM LAYER

CROSS-REFERENCE TO RELATED APPLICATION(S)

This application is a continuation of and claims priority under 35 U.S.C. § 120 to U.S. patent application Ser. No. 16/177,638, entitled "BEARING LAMINATE COMPRISING A FOAM LAYER," by Julia ZIEGLER, et al., filed Nov. 1, 2018, which claims priority under 35 U.S.C. § 119(e) to U.S. Provisional Patent Application No. 62/580,555, entitled "BEARING LAMINATE COMPRISING A FOAM LAYER," by Julia ZIEGLER et al., filed Nov. 2, 2017, of which both applications are assigned to the current assignee hereof and incorporated herein by reference in their entireties.

FIELD OF THE DISCLOSURE

The present disclosure relates to a bearing laminate comprising a metal support, a foam layer including a polymeric foam, and a sliding layer overlying the foam layer.

BACKGROUND

Maintenance-free slide bearings containing a layered structure including a metallic support layer, an intermediate layer and a sliding layer applied thereto are used in a wide variety of technical fields, for example in the field of automotive, electronics, HVAC (heating venting and air conditioning) and bicycle engineering.

There is an ongoing need to improve the known maintenance-free slide bearings by their vibration damping capability, tolerance compensation and wear resistance, and combining these properties with a low-cost design and a cost-efficient manufacturing process.

SUMMARY

According to one embodiment, a bearing laminate comprises a metal support layer; a foam layer overlying the metal support layer, the foam layer including a polymeric foam; and a sliding layer overlying the polymeric foam layer, the sliding layer comprising a polymer matrix.

According to another embodiment, a bearing article formed from a laminate, the laminate comprises a metal support layer; a foam layer overlying the metal support, the foam layer including a polymeric foam; and a sliding layer overlying the foam layer, the sliding layer comprising a polymer matrix.

According to a further embodiment, a method of forming a bearing laminate comprises: providing a metal support layer, a foam layer and a sliding layer; and joining the metal support layer, the foam layer, and the sliding layer using at least one adhesive and applying pressure and/or heat treatment.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

The present disclosure relates to a bearing laminate and a bearing article made from the bearing laminate having favorable vibration- and sound damping properties.

Figure 1:
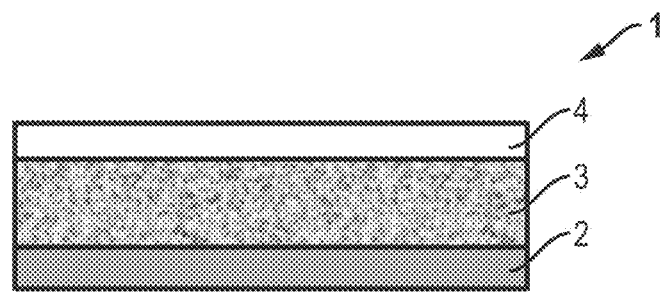
FIG. 1 includes an illustration of a bearing laminate according to one embodiment.

In one embodiment, as shown in FIG. 1, the bearing laminate 1 can include a metal support layer 2, a foam layer 3 overlying the metal support layer, and a sliding layer 4 overlying the foam layer. The bearing laminate thus can contain a layer system having at least three layers.

Figure 2:
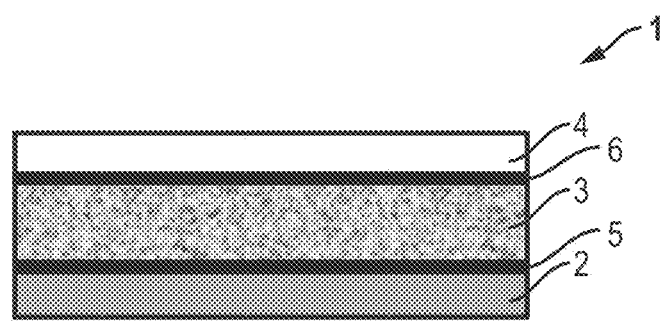
FIG. 2 includes an illustration of a bearing laminate according to one embodiment.

Further layers of the bearing laminate can include, for example, a first adhesive layer 5 between the metal support layer 2 and the foam layer 3, and a second adhesive layer 6 between the foam layer 3 and the sliding layer 4, as illustrated in FIG. 2.

The bearing article formed from the bearing laminate of the present disclosure can have exceptional vibration damping properties, such as a high damping ratio combined with a low dynamic stiffness.

In certain embodiments, the damping ratio of the bearing laminate can be at least 10%, such as at least 15%, or at least 17%. In other embodiments, the damping ratio may be not greater than 50%, such as not greater than 40%, not greater than 30%, not greater than 25%, or not greater 20%. The damping ratio can be a value between any of the minimum and maximum values noted above, such as from 10% to 50%, from 13% to 25%, or from 15% to 20%.

The dynamic stiffness of the bearing laminate can be at least 1 N/µm, such as at least 2 N/µm, at least 5 N/µm, or at least 10 N/µm. In another embodiment, the dynamic stiffness of the bearing laminate may be not greater than 50 N/µm, such as not greater than 30 N/µm, not greater than 20 N/µm, or not greater than 15 N/µm. The dynamic stiffness can be a value between any of the minimum and maximum values noted above, such as from 1 N/µm to 50 N/µm, from 2 N/µm to 20 N/µm, or from 5 N/µm to 15 N/µm.

The exceptional damping properties can be to a large extent related to the polymeric foam present in the foam layer of the bearing laminate. As used herein, the term polymeric foam is intended to mean a solid, highly porous, engineered or natural material which contains gas bubbles dispersed in a solid polymeric material. The polymeric foam of the present disclosure can have a closed cell structure or an open cell structure. A closed cell structure generally mean a gas-filled material wherein the pores are not interconnected, while an open cell structure contains connected pores which form an interconnected network. Although solid foams can be divided into open-cell and closed-cell structures, the cell or pore structure of a solid foam can be a wide range of different sized cells and pores, wherein a certain amount can be of closed-cell structure and of open-cell structure, with one type being the dominating structure.

According to further embodiments, the polymeric foam contained in the foam layer 3 can have a density according to ASTM D3574 of at least 0.15 g/cm$^3$, such as at least 0.25 g/cm$^3$, such as at least 0.4 g/cm$^3$, at least 0.65 g/cm$^3$, at least 0.8 g/cm$^3$, or at least 1.0 g/cm$^3$. In another embodiment, the density of the polymeric foam may be not greater than 2.5 g/cm$^3$, such as not greater than 2.0 g/cm$^3$, not greater than 1.8 g/cm$^3$, not greater than 1.5 g/cm$^3$, or not greater than 1.2 g/cm$^3$. The density of the polymeric foam may be a value between any of the minimum and maximum values noted above, such as from 0.15 g/cm$^3$ to 1.5 g/cm$^3$, from 0.25 g/cm$^3$ to 1.2 g/cm$^3$, or from 0.3 g/cm$^3$ to 0.9 g/cm$^3$.

In yet other embodiments, the polymeric foam of the polymeric foam layer can have an average pore size of at least 20 µm, such as at least 50 µm, at least 100 µm, at least 200 µm, or at least 300 µm. In another aspect the solid foam can have an average pore size of not greater than 1500 µm, such as not greater than 1000 µm, not greater than 700 µm, or not greater than 500 µm. The solid foam can have an average pore size between any of the minimum and maximum values noted above, such as from 20 µm to 1500 µm, from 50 µm to 1000 µm, or from 100 µm to 400 µm.

In yet other embodiments, the polymeric foam of the foam layer can have an anisotropic behavior, wherein a statistical significant number of the pores are oriented in a specific direction, and a majority of the pores can have a non-symmetrical shape, for example an elliptical shape or a tubular shape.

In a further embodiment, the polymeric foam may have a pore volume of at least 0.4 cm$^3$/g, such as at least 0.5 cm$^3$/g, at least 0.7 cm$^3$/g, or at least 1 cm$^3$/g. In another aspect, the pore volume of the polymeric foam can be not greater than 100 cm$^3$/g, such as not greater than 80 cm$^3$/g, not greater than 50 cm$^3$/g, not greater than 20 cm$^3$/g, or not greater than 10 cm$^3$/g. The pore volume of the polymeric foam can be a value between any of the minimum and maximum values noted above, such as from 0.4 cm$^3$/g to 100 cm$^3$/g, from 1 cm3/g to 50 cm$^3$/g, or from 5 cm$^3$/g to 30 cm$^3$/g.

Non-limiting examples of foam materials suitable for the polymeric foam contained in the foam layer can be polyurethane foam, polyethylene foam, polyester foam, acrylate foam, polyvinyl chloride foam (PVC), silicon foam, fluoropolymer foam, nitrile butadiene rubber (NBR) foam, ethylene propylene diene monomer (EPDM) foam, polypropylene foam or any combination thereof. In a particular embodiment, the foam material may consist essentially of a polyurethane foam.

The polymeric foam of the foam layer can include one or more fillers. The fillers contained in the foam layer may be in form of powders, spheres or fibers. Non-limiting examples of filler materials can be glass, carbon, $CaCO_3$, an antioxidant, a thermally conductive material, an electrically conductive material, or any combination thereof. In a certain embodiment, the fillers can be fibers and the fibers may be oriented within the foam layer, for example, in the length direction of the foam layer. Such fiber orientation can result in anisotropic properties of the foam layer.

In aspects, the filler content of the polymeric foam layer may be at least 0.1 wt %, such as at least 0.5 wt %, at least 1 wt %, at least 5 wt %, at least 10 wt %, at least 30 wt %, at least 50 wt %, or at least 70 wt % based on a total weight of the foam layer. In other aspects, the filler amount may be not greater than 90 wt %, such as not greater than 85 wt %, not greater than 80 wt %, or not greater than 75 wt %. The filler content can be a value between any of the minimum and maximum values noted above, such as from 0.1 wt % to 90 wt %, from 1 wt % to 80 wt %, or from 10 wt % to 50 wt % based on the total weight of the foam layer.

In embodiments, the foam layer can have a thickness of at least 0.1 mm, such as at least 0.2 mm, at least 0.3 mm, at least 0.5 mm, or at least 1.0 mm. In other embodiments, the foam layer can have a thickness of not greater than 2.0 mm, such as not greater than 1.5 mm, not greater than 1.3 mm, or not greater than 1.1 mm. The thickness of the foam layer can be a value between any of the minimum and maximum values noted above, such as from 0.1 mm to 2.0 mm, from 0.1 mm to 1.0 mm, from 0.2 mm to 0.9 mm, or from 0.4 mm to 0.8 mm.

Figure 3:
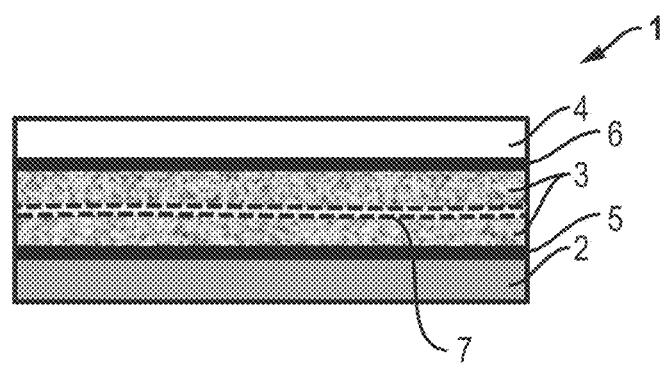
FIG. 3 includes an illustration of a bearing laminate according to one embodiment.

In certain embodiments, the foam layer 3 can include a reinforcing layer 7, as illustrated in FIG. 3. Non-limiting examples of a reinforcing layer can be a mesh, a fleece, a fabric, a film or a foil. The material of the reinforcing layer can be, for example, a metal, an alloy, a polymer, or a ceramic. In particular embodiments, the material of the reinforcing layer can have anisotropic properties. In aspects, the thickness of the reinforcing layer within the foam layer may be at least 0.1 mm, such as at least 0.2 mm, or at least 0.5 mm. In other aspects, the thickness can be not greater than 1.0 mm, such as not greater than 0.9 mm, or not greater than 0.7 mm. The thickness of the reinforcing layer may be a value between any of the minimum and maximum values noted above, such as from 0.1 mm to 1.0 mm, from 0.2 mm to 0.9 mm, or from 0.3 mm to 0.8 mm.

Figure 4:
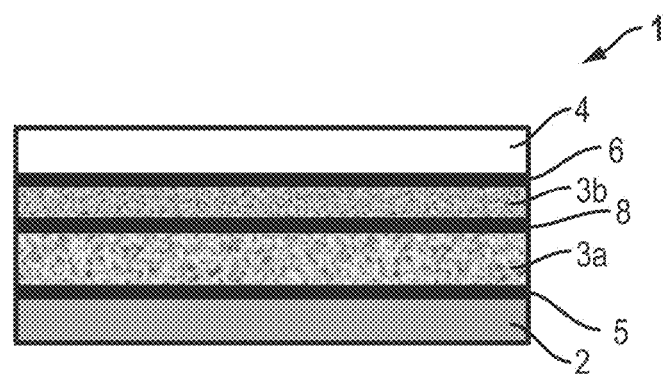
FIG. 4 includes an illustration of a bearing laminate according to one embodiment.

The foam layer 3 of the bearing laminate of the present disclosure can include a plurality of foam sub-layers. In certain embodiments, the foam layer 3 can include at least two foam sub-layers, such as at least three foam sub-layers, at least four foam sub-layers, or at least five foam sub-layers. In a particular embodiment, the sub-foam layers can be connected to each other with an adhesive FIG. 4 illustrates an embodiment of a bearing laminate wherein the foam layer 3 includes two foam sub-layers 3a and 3b, and one adhesive layer 8 connecting foam sub-layer 3a with foam sub-layer 3b. Furthermore, the bearing laminate of FIG. 4 includes a metal support 2, a sliding layer 4, a first adhesive layer 5, combining metal support 2 and foam sub-layer 3a, and a second adhesive layer 6, combining foam sub-layer 3b and sliding layer 4.

The metal support layer of the bearing laminate of the present disclosure can be a continuous layer including chromium, molybdenum, tungsten, manganese, iron, ruthenium, osmium, cobalt, rhodium, iridium, nickel, palladium, platinum, copper, silver, gold, gallium, indium, silicon, germanium, tin, antimony, bismuth, or any combination thereof. In particular embodiments, the metal support layer can be steel, bronze, aluminum, brass, copper, or nickel.

In certain embodiments, the metal support can comprise a coating. The coating of the metal support may be a paint, a sealer or a plating containing organic resins, e.g., epoxy resins. In certain embodiments, the coating can be a metal or alloy including chromium, molybdenum, tungsten, manganese, iron, ruthenium, osmium, cobalt, rhodium, iridium, nickel, palladium, platinum, copper, silver, gold, zinc, aluminum, gallium, indium, silicon, germanium, tin, antimony, bismuth, or any combination thereof. Preferred coating materials of the metal support can be epoxy resin, nickel, copper, zinc, aluminum, or tin.

The thickness of the metal support layer can be at least 0.1 mm, such as at least 0.2 mm, at least 0.3 mm, at least 0.5 mm, or at least 1.0 mm. In other embodiments, the thickness of the metal support layer may be not greater than 2.0 mm, such as not greater than 1.5 mm, or not greater than 1.1 mm. The thickness of the metal support layer can be a value between any of the minimum and maximum values noted above, such as from 0.1 mm to 2.0 mm, from 0.2 mm to 1.5 mm, or from 0.2 mm to 1.0 mm.

As illustrated in FIGS. 2, 3, and 4, the metal support layer 2, the foam layer 3 and the sliding layer 4 of the bearing laminate of the present disclosure can be combined to each other by a first adhesive layer 5, attaching the metal support layer 2 to the foam layer 3, and a second adhesive layer 6, combining the sliding layer 4 with the foam layer 3. The first adhesive layer 5 and the second adhesive layer 6 can include the same type of adhesive or different adhesives. In the embodiment where the foam layer 3 includes at least two foam sub-layers, as illustrated in FIG. 4, the adhesive layer 8 combining the sub-foam layers 3a and 3b can be also the same type of adhesive as used for the first adhesive layer 5 and/or the second adhesive layer 6 or can be different. Non-limiting examples of adhesives that can be used in adhesive layers 5, 6, and/or 8 may include acrylate-based adhesive, epoxy adhesive, polyimide adhesive, fluoropolymer based adhesive, a low-temperature hot melt adhesive, in particular ethylene-vinyl acetate or polyether-polyamide copolymers, or any combination thereof. In a particular embodiment, the adhesive can be in both the first adhesive layer 5 and the second adhesive layer 6 an acrylate-based pressure sensitive adhesive.

The thickness of the first adhesive layer 5, the second adhesive layer 6, and of any adhesive layer combining two foam sub-layers can be the same or different from each other. In certain aspects, the thickness of the adhesive layers can be at least 0.001 mm, such as at least 0.005 mm, at least 0.01 mm, or at least 0.05 mm. In other aspects, the thickness of the adhesive layers may be not greater than 0.5 mm, such as not greater than 0.4 mm, not greater than 0.3 mm, not greater than 0.2 mm, or not greater than 0.1 mm. The thickness of the adhesive layers can be a value between any of the minimum and maximum values noted above, such as from 0.001 mm to 0.5 mm, from 0.05 mm to 0.4 mm, or from 0.01 mm to 0.25 mm.

The sliding layer 4 overlying the foam layer 3 can include a polymer matrix. Non-limiting material examples of the polymer matrix can be polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoroethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), of polyether-ether-ketone (PEEK), polyetherketone (PEK), liquid crystal polymer (LCP), polyamide (PA), polyoxymethylene (POM), polyethylene (PE)/UHMPE, polypropylene (PP), polystyrene, styrene butadiene copolymers, polyesters, polycarbonate, polyacrylonitriles, polyamides, styrenic block copolymers, ethylene vinyl alcohol copolymers, ethylene vinyl acetate copolymers, polyesters grafted with maleic anhydride, polyvinylidene chloride, aliphatic polyketone, liquid crystalline polymers, ethylene methyl. acrylate copolymer, ethylene-norbomene copolymers, polymethylpentene and ethylene acrylic acid copolymer, or any combination thereof. In a particular embodiment, the polymer matrix can include PTFE.

Figure 5:
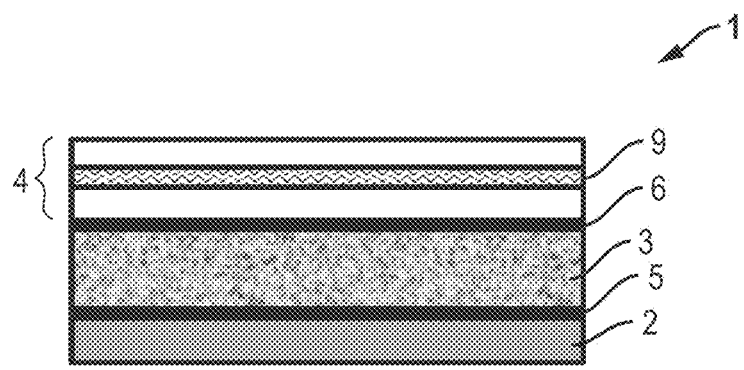
FIG. 5 includes an illustration of a bearing laminate according to one embodiment.

In certain embodiments, the sliding layer 4 can include a reinforcing layer 9, as illustrated in bearing laminate of FIG. 5, including a support layer 2, a first adhesive layer 5, a foam layer 3, a second adhesive layer 6, a sliding layer 4, and a reinforcing layer 9 within the sliding layer 4. Non-limiting examples of a reinforcing layer 9 can be a film, a foil or a porous layer like a mesh, a fleece, a fabric or stretched material. The material of the reinforcing layer can be, for example, a metal, an alloy, a polymer, or a ceramic. In particular embodiments, the material of the reinforcing layer can have anisotropic properties. In aspects, the thickness of the reinforcing layer within the sliding layer may be at least 0.1 mm, such as at least 0.2 mm, or at least 0.5 mm. In other aspects, the thickness can be not greater than 1.0 mm, such as not greater than 0.9 mm, or not greater than 0.7 mm. The thickness of the reinforcing layer 9 may be a value between any of the minimum and maximum values noted above, such as from 0.1 mm to 1.0 mm, from 0.2 mm to 0.9 mm, or from 0.3 mm to 0.8 mm.

In embodiments, the sliding layer can have a thickness of at least 2 μm, such as at least 10 μm, at least 20 μm, at least 30 μm, at least 50 μm, at least 100 μm, at least 200 μm, or at least 500 μm. In other embodiments, the sliding layer can have a thickness of not greater than 1000 μm, such as not greater than 900 μm, not greater than 800 μm, not greater than 600 μm, or not greater than 550 μm. The thickness of the sliding layer can be a value between any of the minimum and maximum values noted above, such as from 2 μm to 1000 μm, from 10 μm to 800 μm, or from 100 μm to 600 μm.

In certain embodiments of the laminate of the present disclosure, a thickness ratio of the sliding layer 4 to the foam layer 3 can be at least 1:10, such as at leas 1:5 or at least 1:1. In other certain embodiments, the thickness ratio of the sliding layer to the foam layer may be not greater than 10:1, such as not greater than 5:1, or not greater than 2:1.

In yet further embodiments, the thickness ratio of the foam layer 3 to the total thickness of the bearing laminate can be at least 1:3, such as at least 1:2.5, at least 1:2, or at least 1:1.8. In other embodiments, the thickness ratio of the foam layer 3 to the total thickness of the laminate may be not greater than 1:1.2, such as not greater than 1:1.3 or not greater than 1:1.4. The thickness ratio of the foam layer to the total thickness of the laminate can be a value between any of the minimum and maximum values noted above, such as from 1:3 to 1:1.12 or from 1:2 to 1:1.14.

The bearing laminate of the present disclosure can be formed by providing sheet-like materials of each of the metal support layer 2, the foam layer 3 and the sliding layer 4, and joining the sheets under applied pressure and/or heat.

In one embodiment, the foam layer can be a sheet coated on both sides with an adhesive and joined under pressure with the metal support layer and the sliding layer. In a particular aspect, the adhesive may be a pressure sensitive adhesive including an acrylate compound.

The bearing laminate of the present disclosure can be used for forming a bearing article which may be adapted for use in a head restraint, a ball joint, a hinge, a seat structure, as a friction plate, as a stabilizer bearing, a tolerance compensation component, or as a noise dampener.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A bearing laminate comprising:
a metal support layer;
a foam layer overlying the metal support layer, the foam layer including a polymeric foam; and
a sliding layer overlying the polymeric foam layer, the sliding layer comprising a polymer matrix.

Embodiment 2. A bearing article formed from a bearing laminate, the bearing laminate comprising:
a metal support layer;
a foam layer overlying the metal support layer, the foam layer including a polymeric foam; and
a sliding layer overlying the polymeric foam layer, the sliding layer comprising a polymer matrix.

Embodiment 3. A method for forming a bearing laminate, comprising:
providing a metal support layer, a foam layer including a polymeric foam, and a sliding layer; and
joining the metal support layer, the foam layer, and the sliding layer using at least one adhesive and applying pressure and/or heat treatment.

Embodiment 4. The bearing laminate or method of embodiments 1, 2, or 3, wherein the laminate has a dynamic stiffness of at least 1 N/µm, such as at least 2 N/µm, at least 5 N/µm, at least 7 N/µm, or at least 10 N/µm.

Embodiment 5. The bearing laminate or method of embodiments 1, 2, or 3, wherein the laminate has a dynamic stiffness of not greater than 50 N/µm, such as not greater than 30 N/µm, not greater than 25 N/µm, not greater than 20 N/µm, or not greater than 15 N/µm, or not greater than 10 N/µm.

Embodiment 6. The bearing laminate of embodiments 4 or 5, wherein the laminate has a dynamic stiffness of at least 5 N/µm and not greater than 20 N/µm.

Embodiment 7. The bearing laminate or method of any of the preceding embodiments, wherein the laminate has a damping ratio of at least 10%, such as at least 15%, or at least 17%, or at least 19%.

Embodiment 8. The bearing laminate or method of any of the preceding embodiments, wherein the laminate has a damping ratio not greater than 50%, not greater than, 40%, not greater than 30%, not greater than 25%, not greater than 23%, or not greater than 20%

Embodiment 9. The bearing laminate of embodiments any of the preceding embodiments, wherein the laminate has a damping ratio of at least 17% and not greater than 30%.

Embodiment 10. The bearing laminate or method of any of the preceding embodiments, further comprising a first adhesive layer between the metal support and the foam layer and a second adhesive layer between the foam layer and the sliding layer.

Embodiment 11. The bearing laminate or method according to embodiment 10, wherein the first adhesive layer and the second adhesive layer comprise a same type of adhesive.

Embodiment 12. The bearing laminate or method of embodiment 10, wherein the first adhesive layer includes a different adhesive than the second adhesive layer.

Embodiment 13. The bearing laminate or method of embodiments 10, 11, or 12, wherein the first adhesive layer and/or the second adhesive layer include a pressure sensitive adhesive.

Embodiment 14. The bearing laminate or method of any of the preceding embodiments, wherein the polymeric foam includes a polyurethane foam, a polyethylene foam, a polyester foam, an acrylate foam, a polyvinyl chloride (PVC) foam, a silicon foam, a fluoropolymer foam, a nitrile butadiene rubber (NBR) foam, a ethylene propylene diene monomer (EPDM) foam, a polypropylene foam or any combination thereof.

Embodiment 15. The bearing laminate or method of embodiment 14, wherein the polymeric foam includes polyurethane foam.

Embodiment 16. The bearing laminate or method of embodiment 15, wherein the polymeric foam consists essentially of polyurethane foam.

Embodiment 17. The bearing laminate or method of any of the preceding embodiments, wherein the polymeric foam has a closed cell structure.

Embodiment 18. The bearing laminate or method of any of embodiments 1 to 16, wherein the polymeric foam has an open cell structure.

Embodiment 19. The bearing laminate or method of any of the preceding embodiments, wherein the foam layer includes at least two foam sub-layers.

Embodiment 20. The bearing laminate of method of embodiment 19, wherein the at least two foam sub-layers are connected to each other by an adhesive.

Embodiment 21. The bearing laminate or method of any of the preceding embodiments, wherein the foam layer further comprises a reinforcing layer.

Embodiment 22. The bearing laminate or method of embodiment 21, wherein the reinforcing layer includes a mesh, a stretched material, a fleece, a fabric, a film, or a foil.

Embodiment 23. The bearing laminate or method of embodiments 21 or 22, wherein a material of the reinforcing layer includes a metal, a ceramic, glass fibres, carbon fibres, a plastic or any combination thereof.

Embodiment 24. The bearing laminate or method of any of embodiments 21, 22, or 23, wherein the reinforcing layer has anisotropic properties.

Embodiment 25. The bearing laminate or method of any of the preceding embodiments, wherein the foam layer has a thickness of at least 0.1 mm, such as at least 0.2 mm, at least 0.3 mm, at least 0.5 mm, or at least 1.0 mm.

Embodiment 26. The bearing laminate or method of any of the preceding embodiments, wherein the foam layer has a thickness of not greater than 2.0 mm, such as not greater than 1.5 mm, not greater than 1.3 mm, or not greater than 1.1 mm.

Embodiment 27. The bearing laminate or method of any of the preceding embodiments, wherein a thickness ratio of the sliding layer to the polymeric foam layer is at least 1:10, such as at leas 1:5 or at least 1:1.

Embodiment 28. The bearing laminate or method of any of the preceding embodiments, wherein a thickness ratio of the sliding layer to the polymeric foam layer is and not greater than 10:1, such as not greater than 5:1, or not greater than 2:1.

Embodiment 29. The bearing laminate or method of any of the preceding embodiments, wherein a thickness ratio of the polymeric foam layer to a total thickness of the laminate is not greater than 1:1.2, such as not greater than 1:1.3, or not greater than 1:1.4, or not greater than 1:1.6.

Embodiment 30. The bearing laminate or method of any of the preceding embodiments, wherein a thickness ratio of the polymeric foam layer to a total thickness of the laminate is at least 1:3, or at least 1:2.5, or at least 1:2, or at least 1:1.8.

Embodiment 31. The bearing laminate or method of any of the preceding embodiments, wherein the foam layer further includes a filler.

Embodiment 32. The bearing laminate or method of embodiment 31, wherein the filler of the foam layer includes a glass, $CaCO_3$, an antioxidant, a thermally conductive material, an electrically conductive material, or any combination thereof.

Embodiment 33. The bearing laminate or method of embodiments 31 or 32, wherein an amount of the filler in the foam layer is at least 0.1 wt % based on the total weight of the foam layer, such as at least 5.0 wt %, at least 10 wt %, or at least 70 wt %.

Embodiment 34. The bearing laminate or method of embodiments 31, 32 or 33, wherein an amount of the filler in the foam layer is not greater than 90 wt %, such as not greater than 85 wt %, not greater than 80 wt %, or not greater than 75 wt %.

Embodiment 35. The bearing laminate or method of any of the preceding embodiments, wherein a material of the metal support layer includes chromium, molybdenum, tungsten, manganese, iron, ruthenium, osmium, cobalt, rhodium, iridium, nickel, palladium, platinum, copper, silver, gold, zinc, aluminum, gallium, indium, silicon, germanium, tin, antimony, bismuth, alloys, or any combination thereof.

Embodiment 36. The bearing laminate or method of any of the preceding embodiments, wherein the metal support layer includes steel, bronze, aluminum, brass, copper, nickel, or any combination thereof.

Embodiment 37. The bearing laminate or method according to any one of the preceding embodiments, wherein the metal support further comprises a coating, wherein the coating includes an organic resin, a metal or an alloy.

Embodiment 38. The bearing laminate or method according to embodiment 37, wherein the metal or alloy of the coating includes chromium, molybdenum, tungsten, manganese, iron, ruthenium, osmium, cobalt, rhodium, iridium, nickel, palladium, platinum, copper, silver, gold, zinc, aluminum, gallium, indium, silicon, germanium, tin, antimony, bismuth, or any combination thereof.

Embodiment 39. The bearing laminate or method according to embodiments 37 or 38, wherein the coating of the metal support includes an epoxy resin, nickel, copper, zinc, aluminum, tin, or any combination thereof.

Embodiment 40. The bearing laminate or method of any of the preceding embodiments, wherein the metal support has a thickness of at least 0.1 mm, such as at least 0.2 mm, at least 0.3 mm, at least 0.5 mm, or at least 0.8 mm.

Embodiment 41. The bearing laminate or method of any of the preceding embodiments, wherein the metal support has a thickness of and not greater than 2.0 mm, such as not greater than 1.5 mm, or not greater than 1.0 mm.

Embodiment 42. The bearing laminate or method of any of the preceding embodiments, wherein the polymer matrix of the sliding layer includes polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoroethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymer (LCP), polyetherketone (PEK), polyether ether ketone (PEEK), aromatic polyester of polyether-ether-ketone (EKONOL), polyetherketone (PEK), liquid crystal polymer (LCP), polyamide (PA), polyoxymethylene (POM), polyethylene (PE)/UHMPE, polypropylene (PP), polystyrene, styrene butadiene copolymer, polyester, polycarbonate, polyacrylonitriles, polyamide, styrenic block copolymer, ethylene vinyl alcohol copolymer, ethylene vinyl acetate copolymer, polyester grafted with maleic anhydride, poly-vinylidene chloride, aliphatic polyketone, ethylene-methylacrylate copolymer, ethylene-norbomene copolymer, copolymer of polymethylpentene and ethylene acyrilic acid, or any combination thereof.

Embodiment 43. The bearing laminate or method of embodiment 42, wherein the polymer matrix includes PTFE.

Embodiment 44. The bearing laminate or method of any of the preceding embodiments, wherein the sliding layer further comprises a filler.

Embodiment 45. The bearing laminate or method of embodiment 44, wherein the filler of the sliding layer includes carbon, glass, graphite, EKONOL®, aluminium oxide, molybdenum sulfide, bronze, silicon carbide, polytetra fluoroethylene (PTFE), polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), aromatic polyesters, glass fibers, carbon fibers, PTFE fibers, PPS fibers, aramids, wollastonite or barium sulfate.

Embodiment 46. The bearing laminate or method of embodiment 45, wherein the filler includes graphite, carbon, Ekonol, or any combination thereof.

Embodiment 47. The bearing laminate or method of embodiments 44, 45, or 46, wherein the polymer matrix includes PTFE and the filler includes graphite, carbon, Econol or any combination thereof.

Embodiment 48. The bearing laminate or method of any of the preceding embodiments, wherein the sliding layer further comprises a reinforcing layer.

Embodiment 49. The bearing laminate or method of embodiment 48, wherein the reinforcing layer includes a film, a foil, a mesh, a fleece a fabric or a stretched material.

Embodiment 50. The bearing laminate or method of embodiments 48 or 49, wherein a material of the reinforcing layer includes a metal, a ceramic, glass fibers, carbon fibers, a plastic or any combination thereof.

Embodiment 51. The bearing laminate or method of any of embodiments 48, 49, or 50, wherein the reinforcing layer has anisotropic properties.

Embodiment 52. The bearing laminate or method of any of the preceding embodiments, wherein the sliding layer has a thickness of at least 2 µm, such as at least 10 µm, at least 15 µm, at least 20 µm, at least 30 µm, at least 50 µm, at least 100 µm, or at least 200 µm.

Embodiment 53. The bearing laminate or method of any of the preceding embodiments, wherein the sliding layer has a thickness of not greater than 1000 µm, such as not greater than 900 µm, not greater than 800 µm, not greater than 600 µm, or not greater than 400 µm.

Embodiment 54. The bearing laminate or method of any of the preceding embodiments, wherein the polymeric foam has a density of at least 0.15 g/cm$^3$, such as at least 0.25 g/cm$^3$, such as at least 0.4 g/cm$^3$, at least 0.65 g/cm$^3$, at least 0.8 g/cm$^3$, or at least 1.0 g/cm$^3$.

Embodiment 55. The bearing laminate or method of any of the preceding embodiments, wherein a density of the polymeric foam may be not greater than 2.5 g/cm$^3$, such as not greater than 2.0 g/cm$^3$, not greater than 1.8 g/cm$^3$, not greater than 1.5 g/cm$^3$, not greater than 1.2 g/cm$^3$ or not greater than 1.0 g/cm$^3$, or not greater than 0.9 g/cm$^3$.

Embodiment 56. The bearing laminate or method of embodiments 54 or 55, wherein the polymeric foam has a density of at least 0.15 g/cm$^3$ to not greater than 1.5 g/cm$^3$, of at least 0.25 g/cm$^3$ to not greater than 1.2 g/cm$^3$, or from at least 0.3 g/cm$^3$ to not greater than 0.9 g/cm$^3$.

Embodiment 57. The bearing laminate or method of embodiment 56, wherein the polymeric foam has a density of at least 0.3 g/cm$^3$ to not greater than 0.9 g/cm$^3$ Embodiment 58. The bearing article of any of embodiments 2 or 4-57, wherein the bearing article is adapted for use in a head restraint, a ball joint, a hinge, a seat structure, as a friction plate, as a stabilizer bearing, or as a dampener.

EXAMPLES

The following non-limiting examples illustrate the present invention.

Example 1

Preparing of Bearing Laminates

Bearing laminates were produced by using the following four polyurethane foams: 1) SecureEdge® OP-5C, 2) NORBOND® OP7, and 3) NORBOND® Z520H and 4) Normount V2800. All four foams are products from Saint-Gobain Performance Plastics. The densities and thicknesses of the four foam materials are listed in Table 1 below. All polyurethane foams contained on both surfaces a modified acrylic pressure sensitive adhesive. At one side of each polyurethane foam was applied a 0.25 mm steel backing (material 1.0338). On the other side of each polyurethane foam was applied a) an 0.25 mm thick etched PTFE compound tape as sliding layer, comprising 20-25% EKONOL®, an aromatic polyester, as filler (see samples 1-3 of Table 1), or b) an 0.25 mmm thick etched PTFE tape (see sample 4) or c) a PTFE tape including 25% graphite and carbon as fillers (see sample 5 in Table 1). The polyurethane foam, metal backing and sliding layer for each bearing laminate were joined with a batch press under a pressure of 38 MPa, at a temperature of 40° C., and for a time of 150 seconds.

The obtained bearing laminates are called hereafter: 1) Me-FoamOP5C-PTFE/EKO; 2) Me-FoamOP7-PTFE/EKO; 3) Me-FoamZ520H-PTFE/EKO, 4) Me-FoamV2800-PTFE, and 5) Me-FoamV2800-PTFE/CG.

Example 2

Testing of Dynamic Stiffness and Damping Ratio

Table 1 below summarizes the measured average dynamic stiffness and average damping ratio for bearing laminates "Me-FoamV2800-PTFE" and "Me-FoamV2800-PTFE/CG" produced in Example 1.

Table 1 further includes the tested average dynamic stiffness and average damping ratio for two comparative bearing laminates (X2T100CG and X2T100E), which do not include a polymeric foam layer as intermediate layer, and have a Norglide X2 structure: 250 µm PTFE compound, 250 µm metal backing, and 500 µm Rubber coating.

TABLE 1

| Sample | Laminate Structure | Density of Foam [g/cm3] | Thickness of Foam layer [mm] | Average Dynamic Stiffness [N/µm] | Average Dynamic Damping Ratio [%] |
|---|---|---|---|---|---|
| 1 | Me-FoamOP5C-PTFE/EKO | 0.72 | 0.8 | | |
| 2 | Me-FoamOP7-PTFE/EKO | 0.53 | 0.8 | | |
| 3 | Me-FoamZ520H-PTFE/EKO | 0.48 | 0.5 | | |
| 4 | Me-Foam V2800-PTFE | 0.48 | 0.8 | 8 | 23 |
| 5 | Me-FoamV2800-PTFE/CG | 0.48 | 0.8 | 6.1 | 19.5 |
| 6 | X2T100CG | n.r | n.r | 40 | 8.0 |
| 7 | X2T100E | n.r | n.r. | 28 | 15.5 |

The results summarized in Table 1 show that the highest damping ratio could be obtained with the laminates including a polyurethane foam layer between metal support and sliding layer. The corresponding low dynamic stiffness is typical, because dynamic stiffness and damping ratio generally have an inverse trend. Comparative samples 6 and 7, i.e., X2T100CG and X2T100E, which do not include a foam layer and have the typical Norglide X2 structure, showed the lowest dynamic damping ratios of the tested samples and the highest stiffness values.

Testing of Damping Ratio

The damping ratio is a measure of what fraction of vibration energy is dissipated as heat for every oscillation causing the vibration of a shaft (61) in the center of the tested bearing (62). (see FIGS. 6A and 6B). To measure damping ratio, broadband excitation (0-20 kHz) was injected into the system by a vibration shaker (67) and the force input into the housing (63) was measured using a force transducer (64). The vibration was propagated through the housing (63) and into the bearing (62), through the bearing and into the shaft (61). A fishing wire (65) was used as suspension to isolate external influence. The output vibration from the shaft was then measured as an acceleration using an accelerometer (66).

A natural logarithm was taken of the ratio between the output acceleration and the input force to gain a frequency response function of the system in decibels. A stiff housing and shaft were used to obtain the first resonance peak in the graph, of frequency $f_n$, as the first order mode of the bearing. Either side of the peak at a value of 3 dB less than the peak value, the frequencies $f_1$ and $f_2$ were taken as the half power values below and above the peak, respectively. The damping ratio was then calculated by taking a ratio of the difference between $f_1$ and $f_2$ and the resonance frequency $f_n$ according to the following equation:

Damping Ratio=(half power bandwidth/2×resonance frequency)×100%

For the test, Brüel and Kjær equipment was used, including: 8201 force transducer with a 4675 charge converter; 4219-002 accelerometer; LAN XI data acquisition unit; and Pulse LabShop software. The housing and shaft were made from hardened tool steel and designed to have between 2-3% compressions of the bearing.

Figure 6A:
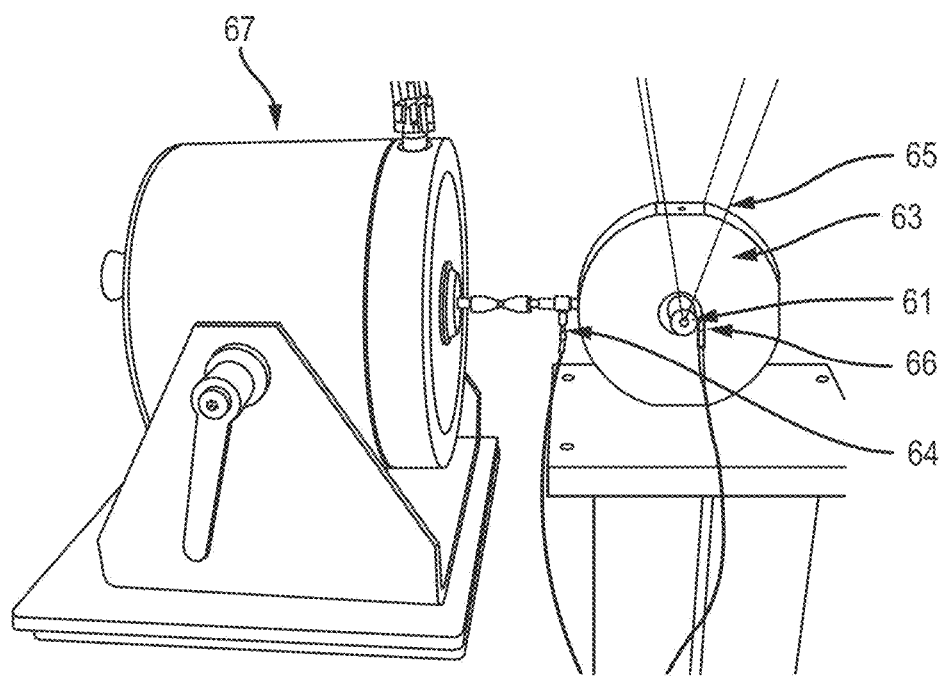
FIG. 6A shows an image of the testing setup for measuring the resonance frequency of the bearing laminates according to embodiments.
Figure 6B:
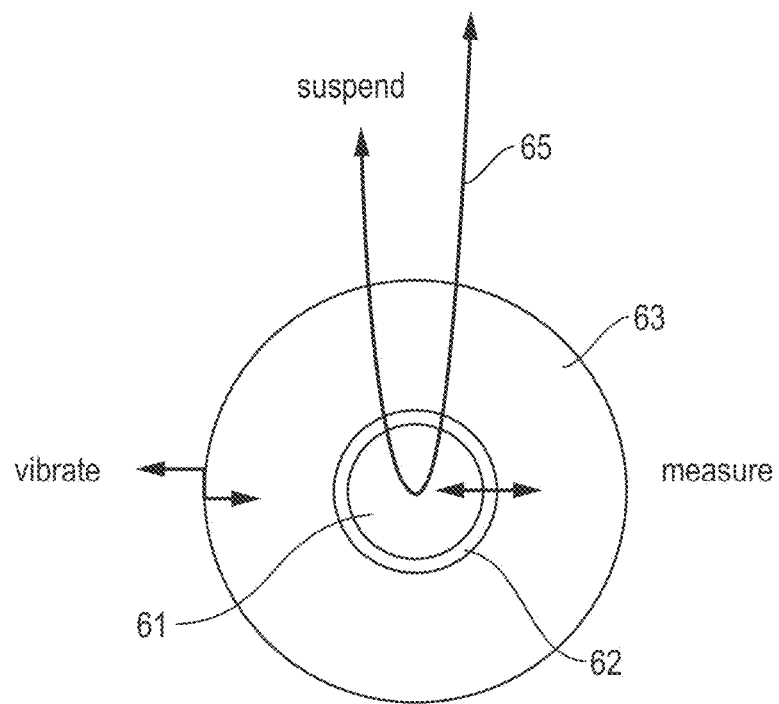
FIG. 6B shows a line-drawing of a partial section of the image shown in FIG. 6A.
Figure 6C:
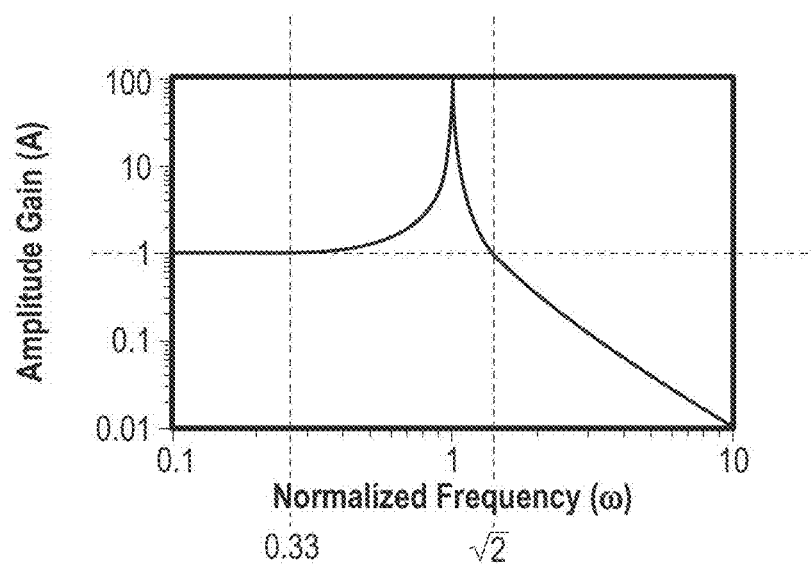
FIG. 6C includes a graph illustrating how to obtain the resonance frequency.

An illustration of the testing setup is shown in FIGS. 6A and 6B. The graph obtained during the testing to derive the resonance frequency can be seen in FIG. 6C.

Testing of Dynamic Stiffness

For the testing of the dynamic stiffness, the resonance frequency was obtained as the value $f_n$ described in the testing method for the damping ratio. The effective mass ($m_e$) was calculated using the mass of the housing ($m_1$) and the mass of the shaft ($m_2$) and the following equation:

$$m_e = \frac{m_1 m_2}{m_1 + m_2}$$

The dynamic stiffness, $k_d$, is then calculated using the following equation:

$$k_d = m_e 4\pi^2 f_n^2$$

As an example the dynamic stiffness value of the Me-FoamV2800PTFE/CG sample of $k_d$=6.069 N/μm was obtained using the following values:

Resonance frequency = $f_n$ = 2.263 kHz

Housing mass = $m_1$ = 1.0539 kg

Shaft mass = $m_2$ = 0.0309 kg $$k_d = \frac{m_1 m_2}{m_1 + m_2} 4\pi^2 f_n^2$$

$$k_d = \frac{1.0539 * 0.0309}{1.0539 + 0.0309} 4\pi^2 2.263^2$$

$$k_d = 6.069 \text{ N/}\mu\text{m}$$

Example 3

Simulation of Performance in Headrest

The bearing laminates Me-FoamOP5C-PTFE/EKO, Me-FoamOP7-PTFE/EKO, and Me-FoamZ520H described in Example 1 and Table 1 were tested in a simulated headrest assembly with regard to the required moving force to move the shaft, while the housing and the tested bearing are fixed.

Figure 7A:
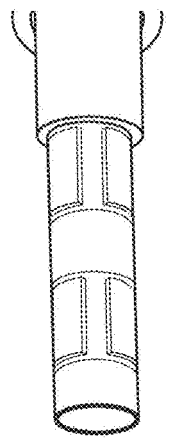
FIG. 7A shows an image of a testing setup for simulating headrest performance, including two stripes of bearing laminates positioned in a guide sleeve according to embodiments.
Figure 7B:
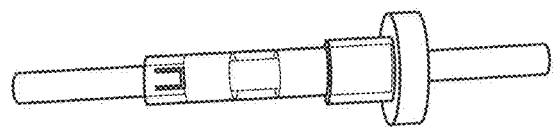
FIG. 7B shows an image of a testing setup for simulating headrest performance, including two stripes of bearing laminates positioned in a guide sleeve and a center shaft according to embodiments.

For the testing, two 50 mm wide stripes of each bearing laminate were formed into two rings and mounted into a guide sleeve. Thereafter, a shaft with 1 mm interference fit was assembled in the center of the guide sleeve, as illustrated in FIGS. 7A and 7B.

Figure 7C:
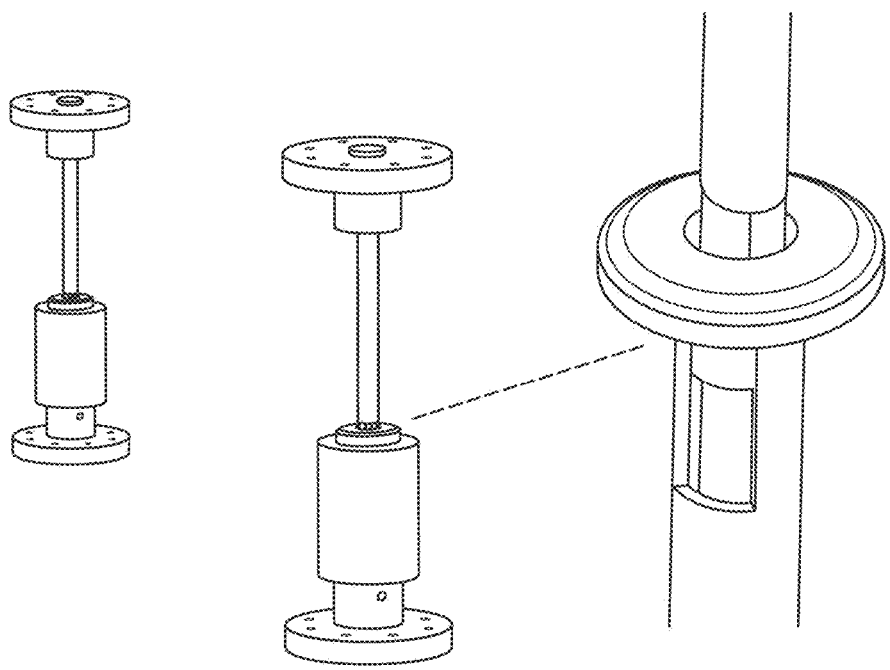
FIG. 7C includes an illustration of a section of the testing setup for simulating headrest performance.
Figure 7D:
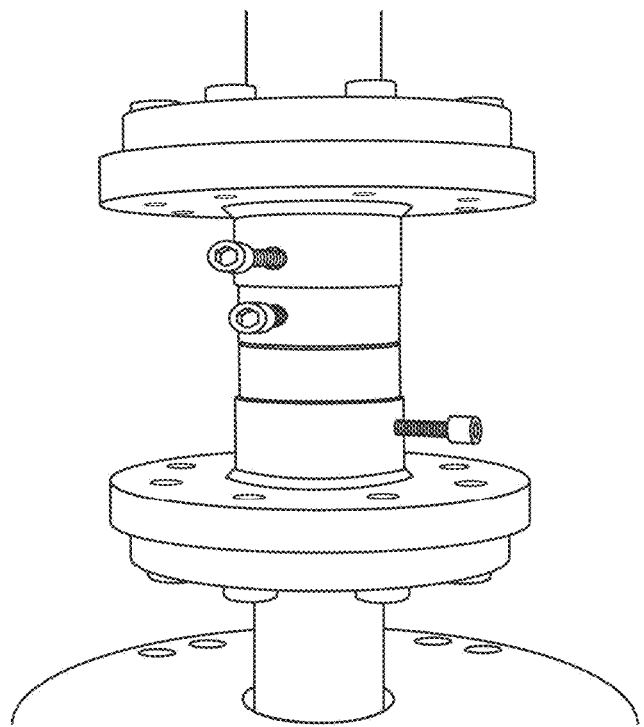
FIG. 7D shows an image of a section of the testing setup for simulating headrest performance.

The movement of a headrest was simulated under room temperature, at 90° C., and at −40° C. and during a certain amount of moving cycles (see Table 2). The testing set-up for the headrest simulation is further illustrated in FIGS. 7C and 7D. The testing was conducted under the following conditions: stroke: +/−50 mm, speed 3 mm/s, and press fit: 0.5-1 mm.

Table 2 illustrates a summary of the test results. The results show that all tested laminates require a low average moving force of below 10 N. In all tested laminates, the moving force increased by a minor amount if the temperature was increased to 90° C. or decreased to −40° C. The lowest moving force was measured for the laminate including foam Z520. Reason could be a lower thickness of the foam layer (0.5 mm instead of 0.8 mm), or the lower density of the foam. Although foams OP5C and OP7 had different densities, this did not show differences in the tested moving force.

TABLE 2

|  | Amount of Cycles | Me-Foam OP5C-PTFE/EKO | Me-Form OP7-PTFE/EKO | Me-Foam Z520H-PTFE/EKO |
|---|---|---|---|---|
| Avg. Moving Force RT [N] | 1000 | 6.5 | 6.5 | 2.2 |
| Avg. Moving Force 90° C. [N] | 10 | 7.1 | 7.1 | 2.4 |
| Avg. Moving Force −40° C. [N] | 10 | 8.3 | 8.2 | 3.1 |

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A bearing laminate comprising:
    a metal support layer, the metal support layer having a thickness of at least 0.1 mm and not greater than 2.0 mm;
    a foam layer overlying the metal support layer, the foam layer including a polymeric foam having a density of at least 0.2 g/cm$^3$ and not greater than 0.9 g/cm$^3$, a thickness of at least 0.1 mm and not greater than 2.0 mm, a pore volume from 0.4 cm$^3$/g to 10 cm$^3$/g, and an average pore size from 20 microns to 300 microns;
    a sliding layer overlying the polymeric foam layer, the sliding layer comprising a polymer matrix; and
    an adhesive layer between the foam layer and the sliding layer, the adhesive layer including a pressure sensitive adhesive or a hot melt adhesive, and each of which comprising an acrylate-based adhesive, an epoxy adhesive, an ethylene-vinyl acetate copolymer, a polyether-polyamide copolymer, or any combination thereof, and wherein the bearing laminate has a damping ratio of at least 10% and not greater than 50%.

2. The bearing laminate of claim 1, wherein the damping ratio is at least 17% and not greater than 50%.

3. The bearing laminate of claim 1, wherein the bearing laminate has an average dynamic stiffness of at least 1 N/μm and not greater than 20 N/μm.

4. The bearing laminate of claim 3, wherein the average dynamic stiffness is at least 2 N/μm and not greater than 15 N/μm.

5. The bearing laminate of claim 1, further comprising an adhesive layer between the metal support and the foam layer.

6. The bearing laminate of claim 1, wherein the polymeric foam includes a polyurethane foam, a polyethylene foam, a polyester foam, an acrylate foam, a polyvinyl chloride (PVC) foam, a silicon foam, a fluoropolymer foam, a nitrile butadiene rubber (NBR) foam, a ethylene propylene diene monomer (EPDM) foam, a polypropylene foam or any combination thereof.

7. The bearing laminate of claim 6, wherein the polymeric foam includes polyurethane foam.

8. The bearing laminate of claim 1, wherein a thickness of the sliding layer is at least 2.0 microns and not greater than 1000 microns.

9. The bearing laminate of claim 1, wherein the sliding layer includes polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymer (LCP), polyetherketone (PEK), polyether ether ketone (PEEK), aromatic polyester of polyether-ether-ketone (EKONOL), polyetherketone (PEK), liquid crystal polymer (LCP), polyamide (PA), polyoxymethylene (POM), polyethylene (PE)/UHMPE, polypropylene (PP), polystyrene, styrene butadiene copolymer, polyester, polycarbonate, polyacrylonitriles, polyamide, styrenic block copolymer, ethylene vinyl alcohol copolymer, ethylene vinyl acetate copolymer, polyester grafted with maleic anhydride, poly-vinylidene chloride, aliphatic polyketone, ethylene-methylacrylate copolymer, ethylene-norbomene copolymer, copolymer of polymethylpentene and ethylene acrylic acid, or any combination thereof.

10. The bearing laminate of claim 9, wherein the sliding layer includes PTFE.

11. The bearing laminate of claim 1, wherein the sliding layer further comprises a filler.

12. The bearing laminate of claim 1, wherein the foam layer further comprises a reinforcing layer, wherein a material of the reinforcing layer includes a metal, an alloy, a ceramic, carbon fibers, glass fibers, or any combination thereof.

13. The bearing laminate of claim 1, wherein the foam layer includes at least two foam sub-layers.

14. The bearing laminate of claim 13, wherein the at least two foam sub-layers are connected to each other by an adhesive.

15. A bearing article formed from a bearing laminate, the bearing laminate comprising:
   a metal support layer, the metal support layer having a thickness of at least 0.1 mm and not greater than 2.0 mm;
   a foam layer overlying the metal support layer, the foam layer including a polymeric foam having a density of at least 0.2 g/cm³ and not greater than 0.9 g/cm³, a thickness of at least 0.1 mm and not greater than 2.0 mm, a pore volume from 0.4 cm³/g to 10 cm³/g;
   a sliding layer overlying the polymeric foam layer, the sliding layer comprising a polymer matrix; and
   an adhesive layer between the foam layer and the sliding layer, the adhesive layer including a pressure sensitive adhesive or a hot melt adhesive, and each of which comprising an acrylate-based adhesive, an epoxy adhesive, an ethylene-vinyl acetate copolymer, a polyether-polyamide copolymer, or any combination thereof, and
   wherein the bearing laminate has a damping ratio of at least 10% and not greater than 50%.

16. The bearing article of claim 15, wherein the bearing article is adapted for use in a head restraint, a ball joint, a hinge, a seat structure, a friction plate, a stabilizer bearing, or a dampener.

17. The bearing article of claim 15, wherein the bearing laminate has a dynamic stiffness of at least 1 N/μm and not greater than 20 N/μm.

18. The bearing article of claim 15, wherein the polymeric foam includes a polyurethane foam, a polyethylene foam, a polyester foam, an acrylate foam, a polyvinyl chloride (PVC) foam, a silicon foam, a fluoropolymer foam, a nitrile butadiene rubber (NBR) foam, a ethylene propylene diene monomer (EPDM) foam, a polypropylene foam or any combination thereof.

19. The bearing article of claim 18, wherein the polymeric foam includes polyurethane foam.

20. The bearing article of claim 15, wherein the foam layer comprises a reinforcing layer, wherein a material of the reinforcing layer includes a metal, an alloy, a ceramic, carbon fibers, glass fibers, or any combination thereof.

* * * * *